Patented June 23, 1936

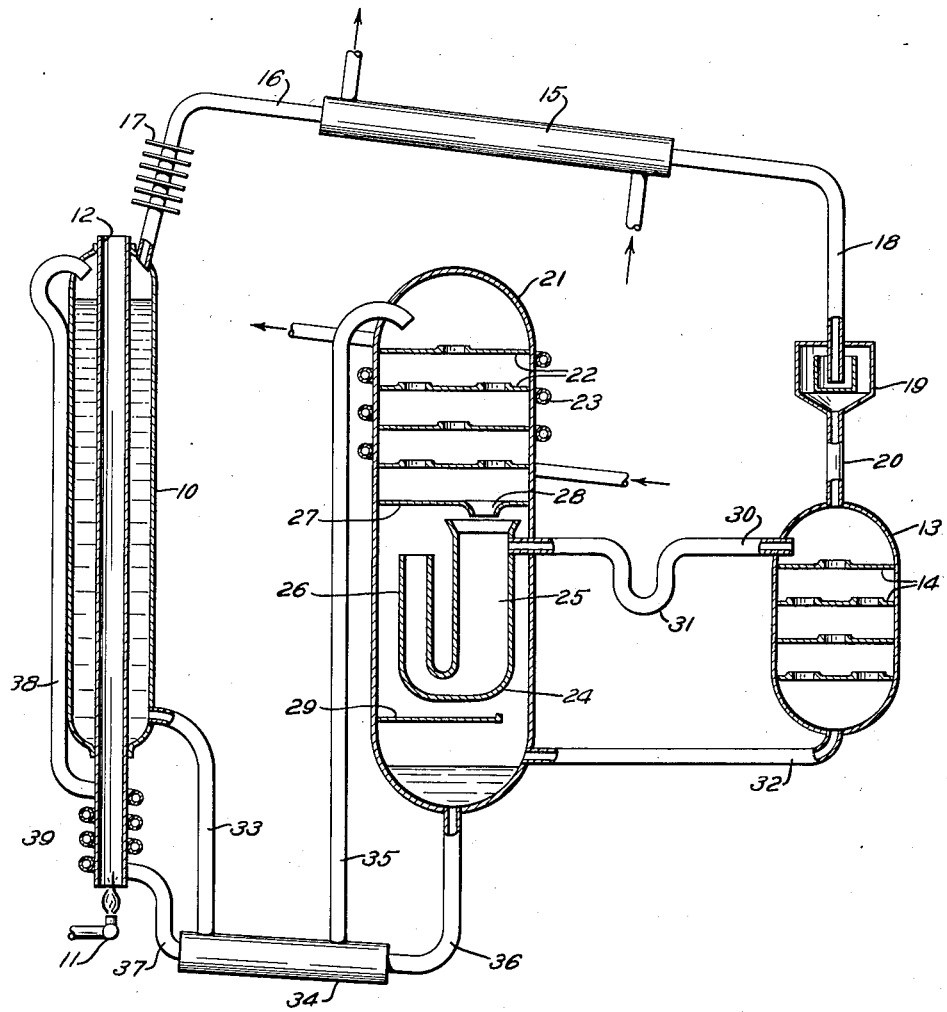

2,045,205

UNITED STATES PATENT OFFICE 2,045,205

REFRIGERATION

Harry C. Shagaloff, Evansville, Ind., assignor, by mesne assignments, to Servel, Inc., Dover, Del., a corporation of Delaware Original application July 8, 1932, Serial No. 621,326. Divided and this application April 10, 1935, Serial No. 15,522

7 Claims. (Cl. 261—114)

This invention relates to refrigeration and more particularly to an absorber for refrigerating systems of the absorption type in which a plurality of cooling fluids are evaporated to produce refrigeration. This application is a division of my application Serial No. 621,326, filed July 8, 1932.

In systems of this type heretofore proposed, a plurality of cooling fluids are evaporated in an evaporator to produce a refrigerating effect and the resulting vapors conducted to an absorber in which one of the vaporous cooling fluids is dissolved into an absorption liquid. From the absorber, another of the vaporous cooling fluids is conducted to a condenser in which it is liquefied and delivered back to the evaporator. The first cooling fluid is expelled from solution by heating the absorption liquid in a generator and the expelled vapor is condensed to liquid and also returned to the evaporator.

In such systems, it is of course necessary that the absorber be operated at a temperature above the condensing temperature of the second cooling fluid at its absorber pressure so that condensation will occur in the second condenser rather than in the absorber. In this connection, it has been proposed to additionally heat the upper part of the absorber to insure the second cooling fluid remaining in vapor phase.

In accordance with this invention, the second cooling fluid is condensed to liquid in the absorber, that is, the absorber is operated at a temperature at which condensation of the second cooling fluid will occur for the pressure of this fluid in the absorber. The liquid cooling fluid is then separated from the enriched absorption liquid by stratification or flotation and returned, preferably directly, to the evaporator.

This invention eliminates a separate condenser for the inert cooling fluid thereby greatly simplifying this type of refrigerating system. Also, there is provided a new and novel absorber whereby a plurality of fluids, immiscible in liquid phase, are separately removed from a mixture thereof.

Other objects and advantages will be apparent from the following description taken in connection with the accompanying drawing in which the figure shows schematically, with parts in vertical section, a refrigerating system contemplated by this invention.

Referring to the drawing, a generator 10 adapted to contain a solution of refrigerant in an absorption liquid is heated by a burner 11 in a flue 12 which extends upwardly through the generator. The vapor space of the generator 10 is connected through rectifier 17 and conduit 16 to a condenser 15 which is connected through conduit 18 to a vessel 19 above the evaporator 13, the latter being provided with baffles 14 as well known in the art. The vessel 19 is connected to drain into the upper part of the evaporator through conduit 20.

The upper part of the absorber or separating vessel 21 is provided with baffle plates 22 and cooling means such as a water circulating coil 23, as well known in the art. In the lower part of the absorber is located a U-shaped vessel or liquid trap 24 having one leg 25 somewhat longer than the other leg 26. Above the liquid trap and below the baffles 22 is a partition 27 provided with an aperture 28 directly above the open end of leg 25 of the trap whereby all liquid descending from the portion of the absorber above the partition is directed into the longer leg 25 of the trap. Other baffles as represented by plate 29 may be provided to receive absorption liquid overflowing from the open end of the short leg 26, as hereinafter described.

The upper end of leg 25 of the trap 24 is connected from a level above the upper end of leg 26 through an overflow conduit 30 provided with a liquid trap 31, to the upper part of the evaporator 13. The lower part of the evaporator is connected through conduit 32 to the lower part of the absorber 21. A system well known in the art for circulating absorption liquid from the generator through the absorber is provided comprising a weak liquid path including conduit 33, liquid heat exchanger 34 and conduit 35, and a strong liquor path including conduit 36, liquid heat exchanger 34, conduit 37, and thermosyphon conduit 38, the lower part 39 of which is coiled about the lower end of the generator flue 12 thereby receiving heat from the burner 11.

As well known in this type of system, there may be employed two cooling fluids chemically inert with respect to each other and an absorption liquid in which only one of the cooling fluids is soluble. For the purpose of description, ammonia and propane are used as the cooling fluids and water as the absorption liquid for the ammonia. In the generator 10, ammonia vapor is expelled from solution by heating and the expelled vapor passes through the rectifier 17 and conduit 16 to the condenser 15 where the vapor is condensed to liquid. From the condenser, liquid ammonia flows through conduit 18 into the vessel 19 from which it flows through conduit 20 into the upper part of the evaporator 13. As more fully described below, liquid propane also enters the upper part of the evaporator 13 from conduit 30. Both the liquid ammonia and liquid propane flow downwardly over the baffle plates 14, evaporating by interdiffusion to produce a refrigerating effect. The resulting gas mixture of ammonia and propane flows from the lower part of the evaporator through conduit 32 into the absorber 21.

Weak absorption liquid from the generator 10 flows through conduit 33, liquid heat exchanger 34, and conduit 35 into the upper part of the absorber 21 where it flows downwardly over baffle plates 22 absorbing ammonia out of the gas mixture of ammonia and propane. As ammonia is absorbed out of the mixture the pressure of the propane approaches the total pressure in the system and by means of the cooling coil 23 the upper part of the absorber is maintained at such a temperature that propane at this increased pressure condenses to liquid.

Both enriched absorption liquid and liquid propane flow through aperture 28 in the partition 27 into the upper end of leg 25 of the U-tube trap or separator 24. Since the immiscible propane is lighter than the absorption liquid, it stratifies and floats on the surface thereof in the leg 25 of the separator. The upper level of liquid propane in leg 25 of the separator will be above the level of enriched absorption liquid in the leg 26 due to difference in density of the liquid in the two columns. The separator is designed such that when it is filled with liquid to the level determined by overflow from the short leg 26, liquid propane will overflow, that is, be decanted through conduit 30 into the upper part of the evaporator 13. Absorption liquid which overflows from the short leg 26 of the separator passes downwardly over baffle plates represented in the schematic drawing by plate 29, further absorbing ammonia vapor, and accumulates in the lower part of the absorber from where it flows through conduit 36, liquid heat exchanger 34, and conduit 37 to the heated portion 39 of the thermosyphon 38 through which it is raised in a manner well known in the art back to the generator.

It will be obvious to those skilled in the art that various changes may be made in the construction and arrangement without departing from the spirit of the invention and therefore the invention is not limited to what is shown in the drawing and described in the specification but only as indicated in the following claims.

What is claimed is:

1. In an absorber for refrigeration apparatus, means for maintaining higher and lower temperature zones, connections for flow of liquid absorbent through said zones in series reversely, connections for flow of vapor through said zones in series respectively, and means for withdrawing immiscible liquid having less specific gravity than said absorption liquid intermediate said zones.

2. An absorber for refrigeration apparatus including a vessel having connections for flow of liquid therethrough and having an inlet connection for vapor, means forming a path of flow for liquid through said vessel including means for detaining liquid in a body having surface levels independent of other liquid surface levels in the apparatus, and means for withdrawing immiscible liquid from said body.

3. An absorber for a refrigeration system including means forming a plurality of gas and liquid contact zones, a substantially U-shaped container having legs of unequal length open at their upper ends and arranged to receive liquid intermediate said zones in the longer leg, and a conduit connected to said longer leg at a point above the upper end of the shorter leg of said U-shaped container.

4. An absorber for refrigeration apparatus including means forming a plurality of gas and liquid contact zones, a vessel arranged to receive liquid intermediate said zones, and means for separately withdrawing immiscible liquids from said vessel.

5. An absorber for refrigeration apparatus having a plurality of refrigerant fluids including means forming a plurality of gas and liquid contact zones, means for maintaining one of said zones at a temperature below the condensing temperature of one of said fluids, and means for withdrawing condensate of said fluid intermediate said zones.

6. An absorber for refrigeration apparatus including a vessel, an inlet connection for vapor adjacent the lower part of said vessel, an inlet for absorption liquid adjacent the upper part of said vessel, an outlet for liquid in the lower part of said vessel, means for cooling the upper part of said vessel, a container for receiving liquid in its path of flow intermediate the upper and lower part of said vessel, and means for withdrawing immiscible liquid from said container.

7. An absorber for refrigeration apparatus including an upright vessel, an inlet connection for vapor adjacent the lower end of said vessel, an inlet connection for absorption liquid adjacent the upper end of said vessel, an outlet connection for absorption liquid in the lower end of said vessel, means for cooling the upper part of said vessel, a substantially U-shaped container having legs of unequal length open at their upper ends and arranged to receive liquid in the longer leg thereof intermediate the upper and lower parts of said vessel, and a conduit connected to the longer leg of said container at a point above the upper end of the shorter leg of said container.

HARRY C. SHAGALOFF.